(12) United States Patent
Hirano et al.

(10) Patent No.: US 8,744,151 B2
(45) Date of Patent: Jun. 3, 2014

(54) DIAGNOSIS ASSISTING SYSTEM, DIAGNOSIS ASSISTING PROGRAM AND DIAGNOSIS ASSISTING METHOD

(75) Inventors: Masaharu Hirano, Setagaya-ku (JP); Futoshi Sakuragi, Minato-ku (JP); Jun Masumoto, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 18 days.

(21) Appl. No.: 13/499,087

(22) PCT Filed: Sep. 29, 2010

(86) PCT No.: PCT/JP2010/005864
§ 371 (c)(1),
(2), (4) Date: Mar. 29, 2012

(87) PCT Pub. No.: WO2011/040014
PCT Pub. Date: Apr. 7, 2011

(65) Prior Publication Data
US 2012/0189181 A1    Jul. 26, 2012

(30) Foreign Application Priority Data
Sep. 30, 2009   (JP) .................................. 2009-226354

(51) Int. Cl.
*G06K 9/00*   (2006.01)
(52) U.S. Cl.
USPC ....................................................... 382/128
(58) Field of Classification Search
USPC .................. 382/128–134; 128/920–925; 356/39–49; 600/407–414, 424–426; 345/581–618; 250/455
See application file for complete search history.

(56) References Cited

U.S. PATENT DOCUMENTS

| 7,369,691 | B2 | 5/2008 | Kondo et al. |
| 2002/0115931 | A1* | 8/2002 | Strauss et al. ................. 600/420 |
| 2004/0249270 | A1* | 12/2004 | Kondo et al. ................. 600/425 |
| 2008/0119713 | A1 | 5/2008 | Le Nezet et al. |

FOREIGN PATENT DOCUMENTS

| JP | 2004-283373 A | 10/2004 |
| JP | 2006-167287 A | 6/2006 |
| JP | 2007-275141 A | 10/2007 |
| JP | 2009-082407 A | 4/2009 |
| JP | 2009-195561 A | 9/2009 |
| WO | 2010/055815 A1 | 5/2010 |

OTHER PUBLICATIONS

Japanese Office Action dated May 7, 2013 issued in Japanese Patent Application No. 2009-226354.
International Search Report of PCT/JP2010/005864 dated Dec. 7, 2010.
Office Action dated Nov. 27, 2013 i issued by the Chinese Patent and Trade Mark Office in counterpart Chinese Patent Application No. 201080043867.5.
Extended European Search Report dated Apr. 11, 2014, issued by the European Patent and Trademark Office in counterpart European Application No. 10 82 0135.

* cited by examiner

*Primary Examiner* — Atiba O Fitzpatrick
(74) *Attorney, Agent, or Firm* — Sughrue Mion, PLLC

(57) ABSTRACT

A CPR image that represents a range corresponding to at least a portion of a blood vessel is generated from volume data obtained by imaging, and arranged in a predetermined region of a display screen. Band shaped condition display regions are arranged outside the predetermined region such that they are parallel to the blood vessel represented by the CPR image. Index values, such as stenosis rates and whether plaque is present, are calculated by analyzing the volume data. The calculated index values are converted to colors (RGB values) by referring to a conversion table. The condition display regions are displayed in colors according to the values of the index values.

9 Claims, 6 Drawing Sheets

STENOSIS RATE (TOTAL)   66%
STENOSIS RATE (HARD)    60%
STENOSIS RATE (SOFT)    0%
PLAQUE FLAG    01

| STENOSIS RATE (TOTAL) x | R | G | B | |
|---|---|---|---|---|
| 0 | 0 | 0 | 0 | BLACK |
| 0 < x ≦ 30 | 0 | 0 | 255 | BLUE |
| 30 < x ≦ 60 | 255 | 255 | 0 | YELLOW |
| 60 < x | 255 | 0 | 0 | RED |

10A

| PLAQUE CODE | | R | G | B | |
|---|---|---|---|---|---|
| 0 | 0 | 0 | 0 | 0 | BLACK |
| 0 | 1 | 255 | 255 | 0 | YELLOW |
| 1 | 0 | 255 | 69 | 0 | ORANGE |
| 1 | 1 | 255 | 0 | 0 | RED |

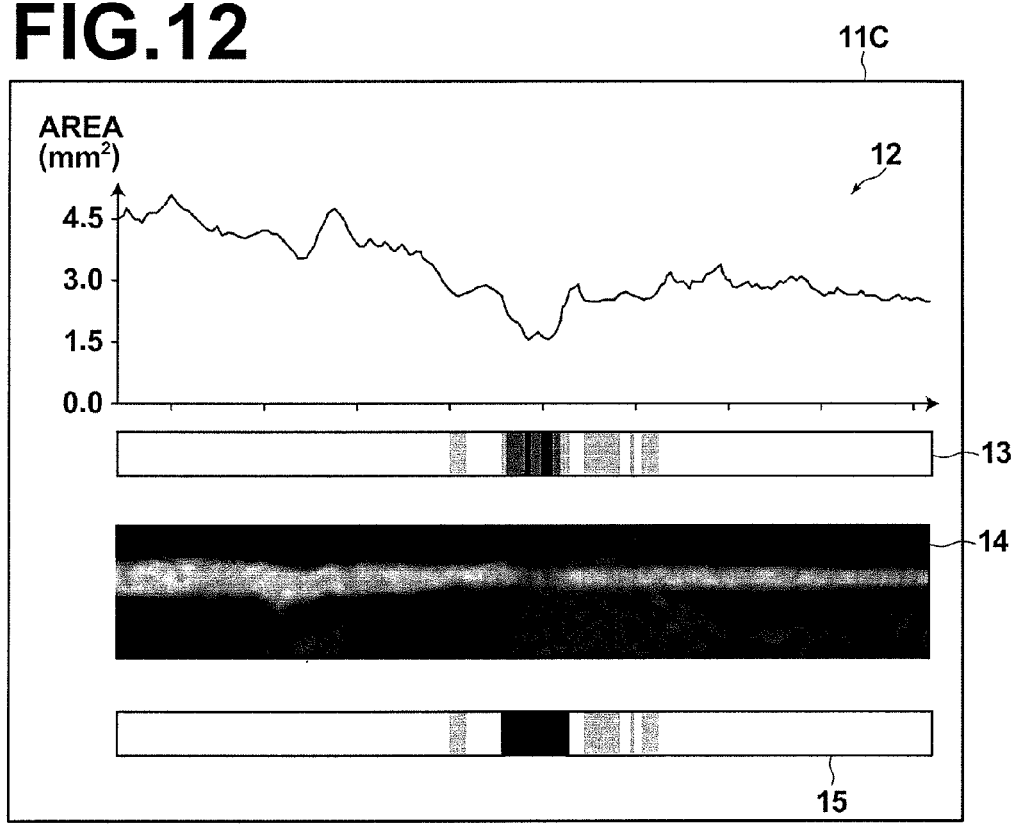

DIAGNOSIS ASSISTING SYSTEM, DIAGNOSIS ASSISTING PROGRAM AND DIAGNOSIS ASSISTING METHOD

CROSS REFERENCE TO RELATED APPLICATIONS

This application is a National Stage of International Application No. PCT/JP2010/005864 filed Sep. 29, 2010, claiming priority based on Japanese Patent Application No. 2009-226354 filed Sep. 30, 2009, the contents of all of which are incorporated herein by reference in their entirety.

TECHNICAL FIELD

The present invention is related to a diagnosis assisting system, a diagnosis assisting computer program, and a diagnosis assisting method for assisting diagnosis of blood vessels by analyzing and visualizing three dimensional image data.

BACKGROUND ART

Early detection of stenosis is extremely important in order to prevent ischemic diseases such as myocardial infarction and cerebral infarction. For this reason, diagnosis assisting apparatuses equipped with blood vessel analyzing functions and blood vessel analyzing software have become available recently. For example, Patent Document 1 discloses a blood vessel stenosis rate analyzing system that detects stenosis sites of blood vessels by analyzing volume data obtained by CT imaging or MRI imaging, and calculates stenosis rates of blood vessels and area stenosis rates. This system displays three dimensional images of blood vessels generated by surface rendering or volume rendering, with colors added based on the calculated stenosis rates (refer particularly to paragraphs 0065 through 0072).

PRIOR ART DOCUMENTS

Patent Documents

[Patent Document 1]
Japanese Unexamined Patent Publication No. 2006-167287

Commonly, the probability that patients will develop diseases such as cardiac infarction becomes higher as the stenosis rate of blood vessels is higher. For this reason, it had conventionally been considered important in blood vessel analysis to specify stenosis sites accurately, and to accurately obtain the stenosis rate at these sites. However, recent research has made it clear that there are health risks even if stenosis rates are low.

There are two known types of plaque which forms on the walls of blood vessels. The two types of plaque are hard plaque and soft plaque. Hard plaque is fat which is deposited on the intima of a blood vessel and calcified. Hard plaque is also referred to as calcified plaque and stable plaque. Stenosis due to hard plaque progresses on the order of several weeks to several months. On the other hand, soft plaque is plaque which is rich in fat components, having a thin fibrous cap which is easy to rupture. Soft plaque is also referred to as vulnerable plaque and unstable plaque. When soft plaque ruptures, bleeding occurs, and blood clots to stop the bleeding are formed within a short amount of time. Thereby, the stenosis rate increases suddenly, causing a major disease such as acute myocardial infarction to occur.

For this reason, it is necessary to judge the health risk by taking not only stenosis rates but also the type of plaque (the likelihood that the plaque will rupture) into consideration in diagnoses of stenosis. In addition, it is necessary to carefully observe not only regions in which stenosis rates are high, but all regions at which stenosis is present, including those at which stenosis rates are low.

The present invention has been developed in view of the foregoing circumstances. The present invention provides a diagnosis screen layout that enable sufficient observation of the states of the intimae of blood vessels over a wide range, while taking stenosis rates into consideration.

DISCLOSURE OF THE INVENTION

A diagnosis assisting apparatus of the present invention is equipped with: a blood vessel extracting means; a CPR image generating means; a condition estimating means; a color determining means; and a display control means, to be described later. A diagnosis assisting program which is stored in a computer readable recording medium of the present invention is a program that causes one or a plurality of computers to function as: a blood vessel extracting means; a CPR image generating means; a condition estimating means; a color determining means; and a display control means, to be described later. The diagnosis assisting program is generally constituted by a plurality of program modules. The function of each of the means listed above is performed by one or a plurality of the program modules. The group of program modules is provided to users by being recorded in storage media such as CD-ROM's and DVD's, by being recorded in a storage unit attached to a server computer in a downloadable state, or by being recorded in network storage (non transitory storage) in a downloadable state. A diagnosis assisting method of the present invention is a method that assists diagnosis of blood vessels, by executing: a blood vessel extracting step; a CPR image generating step; a condition estimating step; a color determining step; and a display control step, to be described later.

The blood vessel extracting means extracts a blood vessel region from volume data obtained by imaging. The blood vessel extracting means also sets a core of the blood vessel and a plurality of cross sections perpendicular to the core. Various methods for extracting blood vessels and setting cores and cross sections have been proposed. The present invention may employ any known method to extract the blood vessel, set the core of the blood vessel, and set the cross sections perpendicular to the core.

The CPR image generating means generates a CPR image that represents a range corresponding to at least a portion of the blood vessel based on data regarding the blood vessel region, the core, and each of the cross sections. It is preferable for the CPR image to be a straightened CPR image. However, the CPR image may be a stretched CPR image or a projected CPR image.

The CPR image generating means may generate a CPR image of the entire blood vessel regardless of whether the entire blood vessel is to be displayed. Alternatively, the CPR image generating means may generate a CPR image only for a range which is specified as an observation range. The observation range may be determined automatically, or be determined based on a specification input by a user. For example, an image of the entirety of a blood vessel region extracted by the blood vessel extracting means may be displayed as a volume rendered image on a screen, and the user may specify a range of a blood vessel to be observed on the screen.

The condition estimating means estimates the condition of stenosis of the blood vessels at each of the cross sections, by analyzing data included in the blood vessel region at each of the cross sections. Here, the condition of stenosis refers to various states of the blood vessel which are related to stenosis. For example, the type of deposited plaque may be estimated in addition to whether stenosis is present and stenosis rates. In addition, a plurality of conditions of stenosis (stenosis rates and types of plaque) may be estimated.

The color determining means determines at least one color that represents the estimated condition of stenosis in each of the cross sections. In the case that there are a plurality of types of estimated conditions of stenosis, a color may be determined for one of the conditions of stenosis, or a color may be determined for each of the conditions. The color may be determined by converting values that represent conditions of stenosis into RGB values that represent colors, based on predetermined conversion tables or conversion formulas.

The color determining means may be that which obtains index values that represent conditions of stenosis (stenosis rates, for example) by performing calculations using formulas which are stored in advance. Alternatively, the color determining means may be that has stored therein a conversion table in which conditions of stenosis and colors are correlated, and refers to the conversion table to determine colors. In the case that there are a plurality of different conditions which are to be displayed with colors, it is preferable for a formula or a conversion table to be prepared for each condition. Alternatively, a formula or a conversion table may be defined such that single colors are assigned to combinations of a plurality of conditions.

The display control means arranges the CPR image in a predetermined region of a display screen, arranges at least one band shaped condition display region outside of the predetermined region parallel to the blood vessel represented by the CPR image, and displays the condition display region with colors based on the at least one color determined by the color determining means. That is, colors are not added to the image of the blood vessel itself, but to a region arranged parallel to the image of the blood vessel. Thereby, the conditions of stenosis at various locations of the blood vessel can be intuitively understood without hindering observation of the image of the blood vessel.

In the case that there are a plurality of conditions of stenosis estimated by the condition estimating means, that is, conditions to be displayed with added colors, the display control means may arrange a plurality of condition display regions on the display screen. For example, in the case that there are two conditions to be displayed with added colors, two condition display regions may be arranged such that they sandwich the CPR image therebetween. Thereby, the conditions can be intuitively understood by the color display, even if there are a plurality of conditions to be considered. In addition, if the layout of the display screen is that in which the two condition display regions are arranged such that they sandwich the CPR image therebetween, confusion during diagnosis, such as non understanding which condition display region represents which condition, can be avoided.

As an example of a specific format, that in which the condition estimating means estimates the stenosis rate of the blood vessel and the type of plaque as the conditions of stenosis; the color determining means determines colors corresponding to the stenosis rate and the type of plaque for each cross section; and the display control means displays a first condition display region with colors based on the stenosis rates and a second condition display region with colors based on the types of plaque may be considered.

According to the apparatus, program, and method of the present invention, a physician can observe the CPR image generated from volume data to confirm the intima of a predetermined range of a blood vessel, while intuitively understanding the conditions of stenosis which are estimated by analysis of the volume data based on colors.

BRIEF DESCRIPTION OF THE DRAWINGS

FIG. 12 is a diagram that illustrates yet another example of a diagnosis screen.

BEST MODE FOR CARRYING OUT THE INVENTION

Hereinafter, embodiments of a diagnosis assisting apparatus, a diagnosis assisting program, and a diagnosis assisting method of the present invention will be described with reference to the attached drawings.

Figure 1:
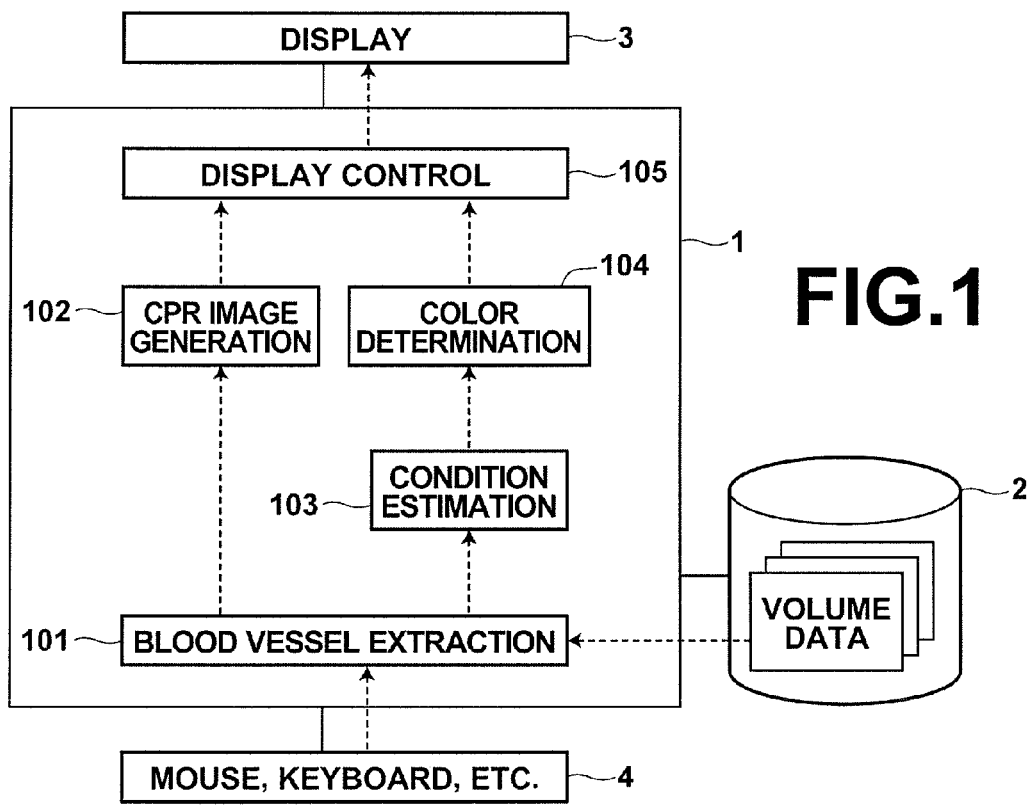
FIG. 1 is a diagram that illustrates the schematic structure of a diagnosis assisting apparatus according to an embodiment of the present invention.

FIG. 1 illustrates the schematic configuration of a diagnosis assisting apparatus 1 realized by installing a diagnosis assisting program in a work station to be utilized by a physician. The diagnosis assisting apparatus 1 is equipped with a processor and memory (not shown) as components of a standard work station. The diagnosis assisting apparatus 1 is further equipped with a storage 2, such as a HDD (Hard Disk Drive) and a SSD (Solid State Drive). In addition, a display 3; and input devices 4 such as a keyboard and a mouse are connected to the diagnosis assisting apparatus 1.

The diagnosis assisting program and data referred to by the diagnosis assisting program (conversion tables, etc., to be described later) are stored in the storage 2 when the diagnosis assisting program is installed in the work station, and loaded into the memory when the diagnosis assisting program is booted up. The diagnosis assisting program defines a blood vessel extracting process, a CPR image generating process, a condition estimating process, a color determining process, and a display control process as processes to be executed by the CPU. The CPU executes each of the processes according to the program. Thereby, the general use work station functions as a blood vessel extracting means 101, a CPR image generating means 102, a condition estimating means 103, a color determining means 104, and a display control means 105.

Volume data forwarded from examination division that perform imaging, or volume data obtained by searching through databases, are stored in the storage 2. The volume data may be volume data directly output from a multiscan CT apparatus or the like, or may be volume data generated by reconstructing groups of two dimensional slice data output from a conventional CT apparatus or the like.

When the selection of a predetermined diagnosis assisting function has been selected in a selection menu, the diagnosis assisting apparatus 1 prompts a user to select or input information necessary to specify a piece of volume data. When apiece of volume data is specified by user operations, the specified piece of volume data is loaded into the memory from the storage 2.

Here, it is assumed that imaging of a patient by a multiscan CT apparatus has been performed during an examination, and volume data that includes data regarding the heart and coronary arteries have been obtained. When the user selects a diagnosis assisting function for diagnosing coronary arteries then inputs a patient ID and an examination date, the volume data corresponding to the patient ID and the examination date are loaded into the memory, and the processes described below are executed.

The blood vessel extracting means 101 extracts a coronary artery region having the outer walls of the coronary arteries as the outline thereof from the volume data. That is, the coronary artery region 5 is constituted by voxel data that represent the walls of blood vessels, plaque deposited within the walls of the blood vessels or on the inner walls of the blood vessels, and the lumens of the blood vessels. The blood vessel extracting means 101 also sets the cores of the coronary arteries and a plurality of cross sections which are perpendicular to the cores.

Figure 2:
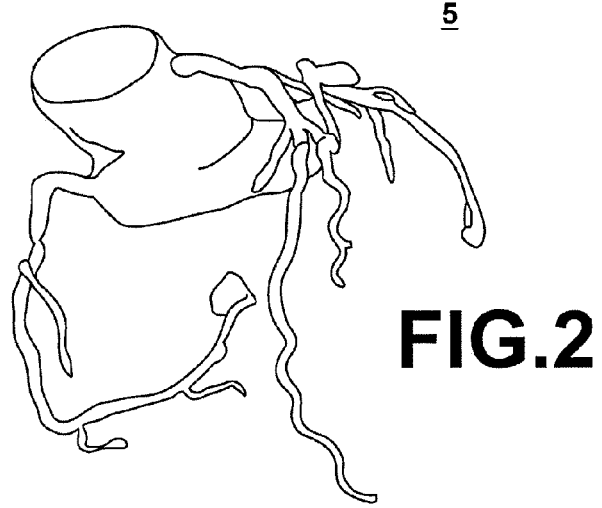
FIG. 2 is a diagram that illustrates an example of an extracted blood vessel region.

In the present embodiment, the blood vessel extracting means 101 extracts the coronary artery region by the method proposed in Japanese Unexamined Patent Publication Nos. 2009-048679 and 2009-069895. In this method, first, positional data of candidate points that represent the cores of the coronary arteries and the main axis directions thereof are calculated based on the values of voxel data that constitute the volume data. Alternatively, a Hessian matrix is calculated for the volume data and the positional data of candidate points that represent the cores of the coronary arteries and the main axis directions thereof may be calculated by analyzing the eigenvalues of the calculated Hessian matrices. Then, the blood vessel extracting means 101 calculates features that represent likeliness of being the coronary arteries, and judgments are made regarding whether the voxel data represents the coronary arteries. The judgments based on features are performed based on evaluation functions which are obtained in advance by machine learning. Thereby, a coronary artery region 5 such as that illustrated in FIG. 2 is extracted from the volume data.

In the above method, the cores of the coronary arteries are set during the process of extracting the coronary artery region 5. In addition, the positions and main axis directions of each of the candidate points that constitute the cores are calculated. Accordingly, cross sections perpendicular to the main axis direction (perpendicular cross sections) can be set at each of the candidate points, based on the calculated data. The cross sections may be set after the coronary artery region 5 is extracted, or may be individually set immediately after the main axis directions are calculated. In addition, the cross sections may be set for all of the candidate points, or only for a sampled portion of the candidate points.

After the coronary artery region 5 is extracted, the blood vessel extracting means 101 generates a volume rendered image of the coronary artery region 5. Markers that indicate the cores are combined with the volume rendered image, and the combined image is output to the display 3. Next, the blood vessel extracting means 101 receives input to set an observation range from the input devices 4. The observation range is set by the user specifying a single blood vessel from among the plurality of branched blood vessels that constitute the coronary arteries as well as a start point and an end point of the observation range along the path of the specified blood vessel, for example.

Note that operations to be administered on the volume rendered image other than the setting of the observation range may be received, such as changing the paths of the cores, and extending the cores. The blood vessel extracting means 101 resets the cores and cross sections in the case that operations such as changes to the paths are detected.

The data regarding the coronary artery region, the cores, the cross sections, and the observation range specified by the user are supplied by the blood vessel extracting means 101 to the CPR image generating means 102 and the condition estimating means 103.

Figure 3:
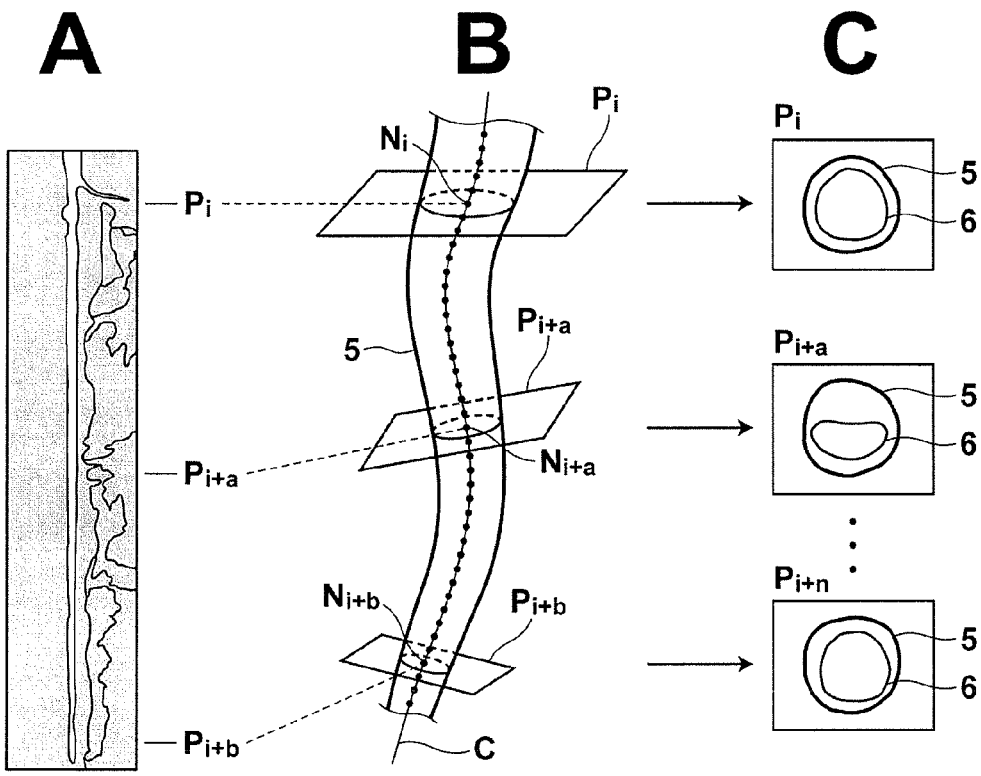
FIG. 3 is a collection of diagrams that illustrate the outlines of a CPR image generating process and a stenosis rate estimating process.

Hereinafter, the processes performed by the CPR image generating means 102 and the condition estimating means 103 will be described with reference to FIG. 3. A of FIG. 3 is a diagram that illustrates an example of a CPR image generated by the CPR image generating means 102. B of FIG. 3 is a diagram that schematically illustrates a portion of the coronary artery region 5 extracted by the blood vessel extracting means 101. C in FIG. 3 is a collection of diagrams that illustrate perpendicular cross sectional images of the coronary artery region 5. The candidate points and the cross sections set by the blood vessel extracting means 101 are denoted by ID numbers that start from 1. An nth candidate point will be denoted as $N_n$, and a cross section that includes an nth candidate point will be denoted as P. B and C in FIG. 3 illustrate an ith, an (i+a)th, and an (i+b)th candidate points and cross sections (wherein a<b).

The CPR image generating means 102 generates the image of A of FIG. 3, based on the data indicated in B of FIG. 3. That is, the CPR image generating means 102 employs the data obtained by the blood vessel extracting means 101 (the coronary artery region 5, the positions and main axis directions of the candidate points, the paths of the cores, the positions and orientations of the cross sections P) to generate straightened CPR images by a known procedure. In the present embodiment, the CPR image generating means 102 selects a blood vessel in which the start point and the end point of the observation range has been set, and generates a straightened CPR image that represents the entire range of the blood vessel. Thereby, if an operation to change the observation range is detected, the display control means to be described later can switch the observation range at high speed, using the CPR image which has already been generated.

The condition estimating means 103 analyzes the data included in the coronary artery region 5 based on the data illustrated in B of FIG. 3, as illustrated in C of FIG. 3. That is, voxel data groups that constitute each of the cross sections are extracted from the volume data, and coronary artery regions 5 (regions having the outer walls of the coronary artery as an outline) and lumen regions 6 (regions having the inner walls of the coronary artery as an outline) are discriminated based on the voxel data values. Further, average diameters and areas of the lumen regions 6 are obtained based on the discriminated regions. Alternatively, minimum diameters may be obtained instead of the average diameters.

Figure 4:
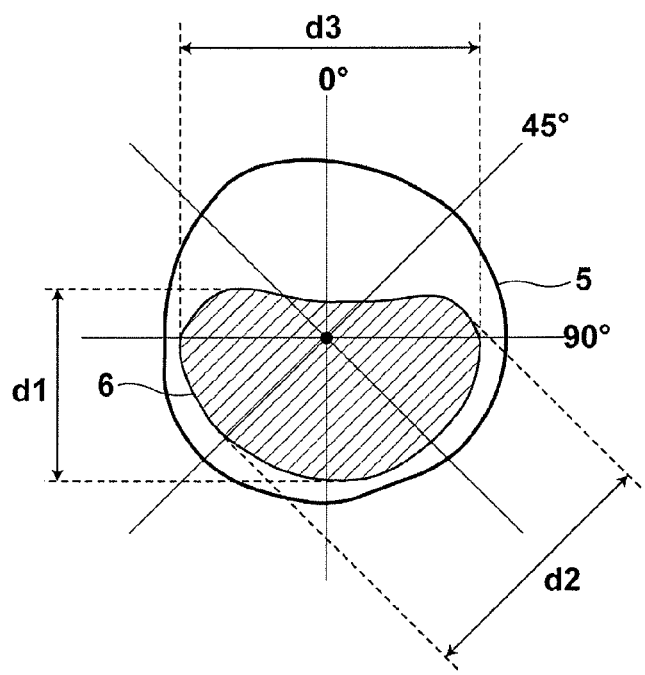
FIG. 4 is a diagram that illustrates the definitions of an average diameter, a minimum diameter, and an area of a lumen of a blood vessel.

The average diameters are obtained by setting three directions oriented at 0 degrees, 45 degrees, and 90 degrees in each cross section as illustrated in FIG. 4 (alternatively 4 or more directions may be set), and by calculating diameters d1, d2, and d3 of the lumen region 6 along each direction. Then, the average values (d1+d2+d3)/3 of the calculated values are designated as the average diameters of the cross sections. The areas of the lumen regions 6 are calculated based on the number of pieces of voxel data that constitute the lumen regions 6. Note that in the case that minimum diameters are obtained instead of the average diameters, the diameters d1, d2, and d3 are calculated in the same manner, and the minimum values among the calculated values (d1 in the example of FIG. 4) are designated as the minimum diameters of the cross sections.

Figure 5:
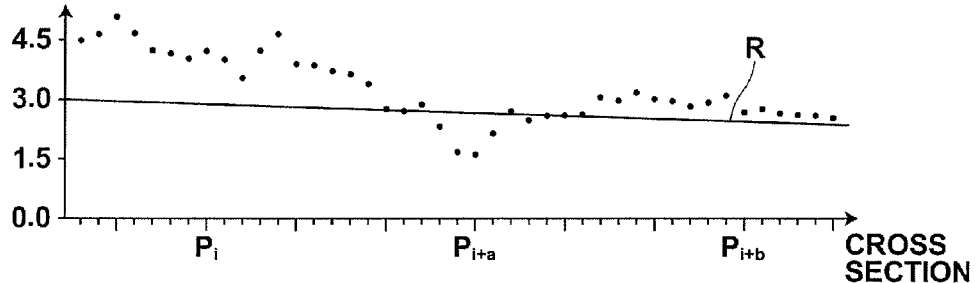
FIG. 5 is a graph that illustrates a method for estimating the diameters of healthy blood vessels.

After the average diameters and the areas of each of the cross sections are obtained, the condition estimating means 103 estimates average diameters and areas for a coronary artery in a healthy state. The average diameters and areas for a healthy state may be automatically estimated by regression analysis, for example. FIG. 5 is a graph that illustrates a method for obtaining average diameters by regression analysis. If the average diameter calculated for each cross section is plotted on a graph having the cross sections as the horizontal axis and the average diameters as the vertical axis, then regression analysis is performed, a regression line R can be calculated as illustrated in FIG. 5. However, the regression line R also depends on the algorithm of regression analysis, and therefore the regression line R illustrated in FIG. 5 is merely an example. Various known algorithms may be employed as the algorithm of regression analysis. In addition, a regression curve may be set instead of the regression line.

Note that after the regression line, etc., is set, the condition estimating means 103 may reset the regression line, etc., based on user input. For example, the graph illustrated on FIG. 5 may be displayed on a display Screen, and user input to change the position and the slope of the line R may be received. Then, the line R set by user operations may be defined as that which represents average diameters of the coronary artery in a healthy state, and the processes to follow thereafter may be performed. The areas of the coronary artery in a healthy state may also be estimated automatically or semiautomatically by a similar process.

As a further alternative, the condition estimating means 103 may estimate the average diameters and the areas of the coronary artery in a healthy state based on user input. In this case, the condition estimating means 103 displays a graph such as that illustrated in FIG. 5 on the display screen, and receives input of an operation that specifies one or a plurality of ranges in the direction of the horizontal axis. Alternatively, input to specify one or a plurality of ranges may be received in the CPR image to be displayed on the display screen by the display control means to be described later. When the user specifies a range which is considered to be healthy, that is, a range in which stenosis is not present, the condition estimating means 103 sets a line (or a curve) that connects only plotted points within the specified range. Then, the set line, etc. is defined as a line that represents the average diameters of the coronary artery in a healthy state, and the processes to follow thereafter are performed. The areas of the coronary artery in a healthy state may also be estimated by a similar process.

After the average diameters of the lumen regions 6 are calculated based on the volume data, and further, after the average diameters of the lumen regions 6 in a healthy state are estimated, the condition estimating means 103 calculates the stenosis rates of the coronary artery by a predetermined calculation. Here, the stenosis rates are defined as the ratios of the average diameter obtained based on the volume data with respect to the average diameters of the coronary artery in a healthy state obtained by regression analysis or the like. For example, in the example illustrated in FIG. 5, the average diameters of the coronary artery in a healthy state are approximately 3 mm. The average diameter at cross section $P_{i+a}$ is 1.5 mm, and the average diameter at cross section $P_{i+b}$ is greater than 3 mm. Therefore, the stenosis rate at cross section $P_{i+a}$ is (3−1.5)/3.100=500, and the stenosis rate at cross section $P_{i+b}$ is (3−3)/3.100=0%. Note that the definition of stenosis is not limited to ratios employing the average diameters, and may be ratios employing minimum diameters or areas.

Figure 6:
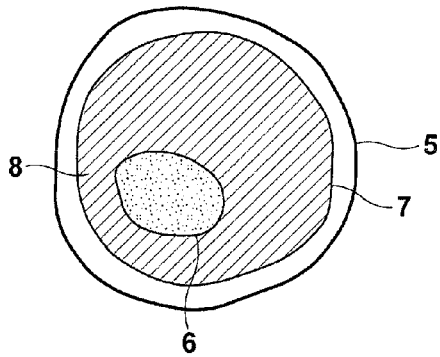
FIG. 6 is a diagram for explaining how types of plaque are classified.

In addition, following the process for calculating the stenosis rates (or concurrently with the process for calculating the stenosis rates), the condition estimating means 103 executes a process to classify the type of plaque which is deposited within the blood vessel walls or on the surfaces of the inner walls of the blood vessel. The condition estimating means estimates an outline of a lumen region in a healthy state for each cross section, based on the average diameters of the coronary artery in a healthy state. In the example above, for example, the average diameters of the coronary artery in a healthy state are approximately 3 mm. Therefore, the lumen region in a healthy state can be assumed to be a tubular region having a diameter of approximately 3 mm. In this case, lumen regions in a healthy state will be approximately circular regions in cross section. FIG. 6 illustrates the coronary artery region 5, the lumen region 6, and the outline 7 of a lumen region in a healthy state. By estimating the outline 7 for each cross section, regions 8 at which plaque may be present (the hatched portion in FIG. 6) are specified in each cross section.

The condition estimating means 103 detects soft plaque regions and hard plaque regions from the regions 8, by analyzing the values of voxel data that constitute the regions 8. The type of plaque can be distinguished by the signal values output from modalities, that is, the values of voxel data that constitute the cross sections.

For example, it is known that output CT signal values differ by approximately an order of magnitude between soft plaque and hard plaque. For example, it has been reported that signal values output by a 4 slice multiscan CT apparatus are within a range of approximately 40 HU to 50 HU for soft plaque, whereas the signal values are within a range from 400 HU to 1100 HU for hard plaque. In addition, in MRI, signals that represent fat can be selectively lowered by imaging using the STIR (Short TI Inversion Recovery) method. Accordingly, soft plaque, which has a large fat component, can be visualized in a state in which it is distinguishable from hard plaque by performing imaging using the STIR method.

The condition estimating means 103 calculates the area of a soft plaque region (the number of voxel data having values corresponding to soft plaque) and the area of a hard plaque region (the number of voxel data having values corresponding to hard plaque) in each cross section, to judge whether soft plaque and hard plague are present. In the case that only soft plaque is detected, a 2 bit code of 10 is output as a code that represents the presence or absence of plaque. In the case that only hard plaque is detected, a 2 bit code of 01 is output, in the case that both soft plaque and hard plaque are detected, a 2 bit code of 11 is output, and in the case that no plaque is detected, a 2 bit code of 00 is output as the code that represents the presence or absence of plaque.

Figure 7:
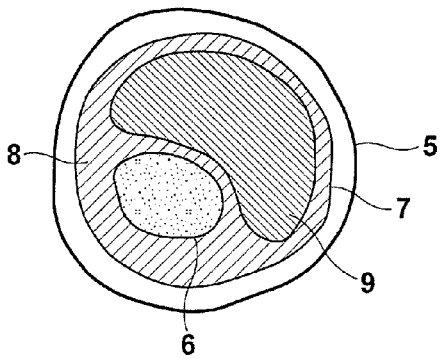
FIG. 7 is a diagram that illustrates an example of calculated index values that represent conditions of stenosis.

In addition, the condition estimating means 103 calculates the ratio of the area of each of the soft plaque regions and the hard plaque regions with respect to the area of the lumen region in a healthy state. That is, a stenosis rate is calculated with respect to each type of plaque separately from the previously calculated stenosis rate. Thereby, four index values: a total stenosis rate, a stenosis rate focused only on hard plaque, a stenosis rate focused only on soft plaque, a code that indicates whether each type of plaque is present, are obtained for each cross section, as illustrated in FIG. 7. Note that FIG. 7 illustrates an example in which a large portion of the region 8 is a hard plaque region 9. Soft plaque is not detected in the example of FIG. 7. Therefore the plaque code is 01, and a stenosis rate focused only on hard plaque of 60% is calculated.

The index values obtained by the condition estimating means 103 are supplied to the color determining means 104. Hereinafter, the processes performed by the color determining means 104 and the processes performed by the display control means will be described in a correlated manner.

The color determining means 104 determines the color (RGB value) that represents each cross section, based on the index values supplied by the condition estimating means 103. In the present embodiment, a plurality of types of conversion tables, in which the index values and RGB values are correlated, are stored in the memory in advance. The color determining means 104 determines the colors by referring to the conversion tables.

Figures 8, 9:
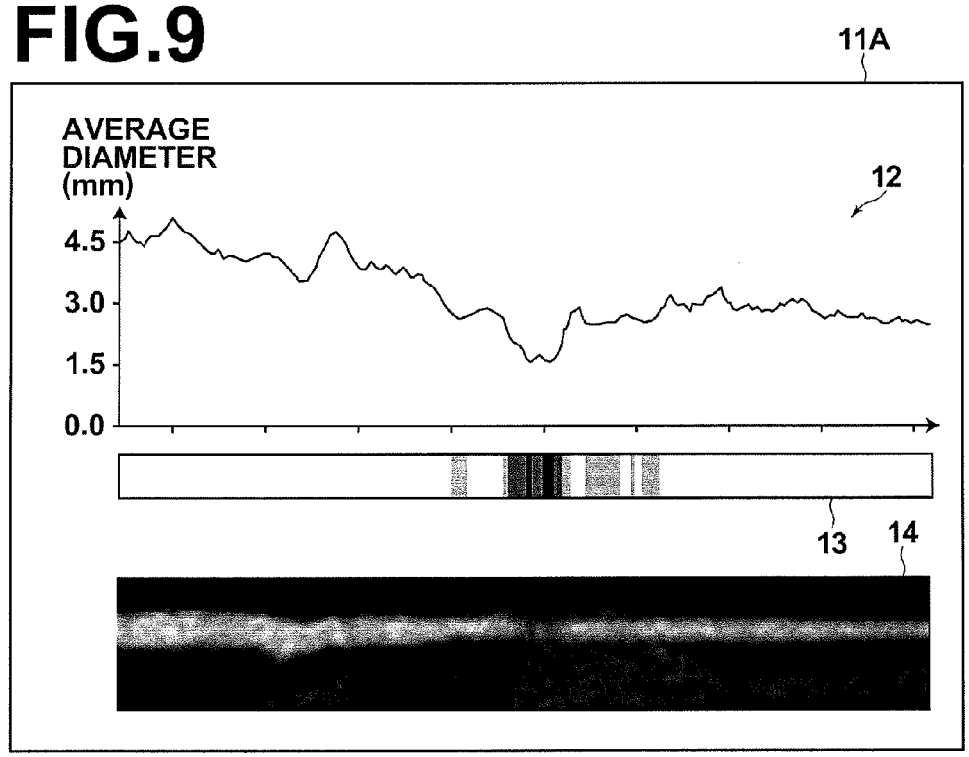
FIG. 8 is a diagram that illustrates an example of a conversion table.
FIG. 9 is a diagram that illustrates an example of a diagnosis screen.

FIG. 8 illustrates an example of a conversion table. The conversion table 10A of FIG. 8 is a map that correlates total stenosis rates that do not depend on the type of plaque with RGB values. Stenosis rates are classified into four steps, and RGB values that represent "black", "blue", "yellow", and "red" are correlated with stenosis values in ascending order. However, in the case that the background color of the display screen is a color other than black, it is preferable for the same color as the background color of the screen to be correlated with the lowest stenosis rate instead of "black".

FIG. 9 illustrates an example of a display screen output by the display Control means 105. A straightened CPR image 14, a graph 12 that shows the average diameters of the lumen regions 6, and a band shaped condition display region 13 are arranged in a display screen 11A. The straightened CPR image 14 is arranged in an orientation such that the core of the coronary artery extends in the horizontal direction of the screen. The graph 12 and the condition display region 13 are arranged above the CPR image 14.

The positional relationships among the straightened CPR image 14, the graph 12, and the condition display region 13 is controlled by the display control means 105 such that the scales/ranges of the graph 12 and the condition display region 13 are the same as the scale/range of the CPR image in the horizontal direction. In addition, the display control means 105 controls the display of the straightened CPR image 14, the graph 12, and the condition display region 13 such that only the range which has been specified as the observation range is displayed on the screen. In addition, the display control means 105 receives scrolling operations and the like to changes the observation range, and updates the screen according to the input operations.

In the case that the intervals among the cross sections of the CPR image is 6 pixels, for example, the graph 12 is that in which the index values calculated for each cross section are plotted at 6 pixel intervals. Regions having widths of 6 pixels are assigned to each cross section in the condition display region 13, and the RGB values determined by the color determining means 104 are set as the values of the colors of each region.

Note that in FIG. 9, the colored display of the condition display region 13 is expressed as shading. The shading represents red, yellow, and blue in order from darkest to lightest. FIG. 9 illustrates that the condition display region 13 is colored red at a portion corresponding to the portion at which the average diameter is smallest in graph 12 and the CPR image 14 is displayed dark blood vessel.

Note that the condition display region 13 is arranged above the CPR image 14 in the display screen 11A. Alternatively, the condition display region 13 may be arranged below the CPR image 14. In addition, two condition display regions 13 may be arranged above and below the CPR image 14 so as to sandwich the CPR image 14 therebetween, as in the display screen 11B illustrated in FIG. 10.

In the display screens 11A and 11B, the stenosis rate at each portion of the coronary artery is displayed as a color. Therefore, a physician who performs diagnosis can intuitively understand the portions at which stenosis is present and the degree of stenosis. Red is widely recognized as a color that represents danger, yellow is widely recognized as a color that represents that care is necessary, and blue is widely recognized as a color that represents safety. Therefore, by defining the conversion table such that red and yellow are assigned to conditions having greater degrees of danger (stenosis rates) as in the conversion table of FIG. 8, even those who are using the diagnosis assisting apparatus for the first time can intuitively understand the meaning of the display without referring to a user manual.

Figures 10, 11:
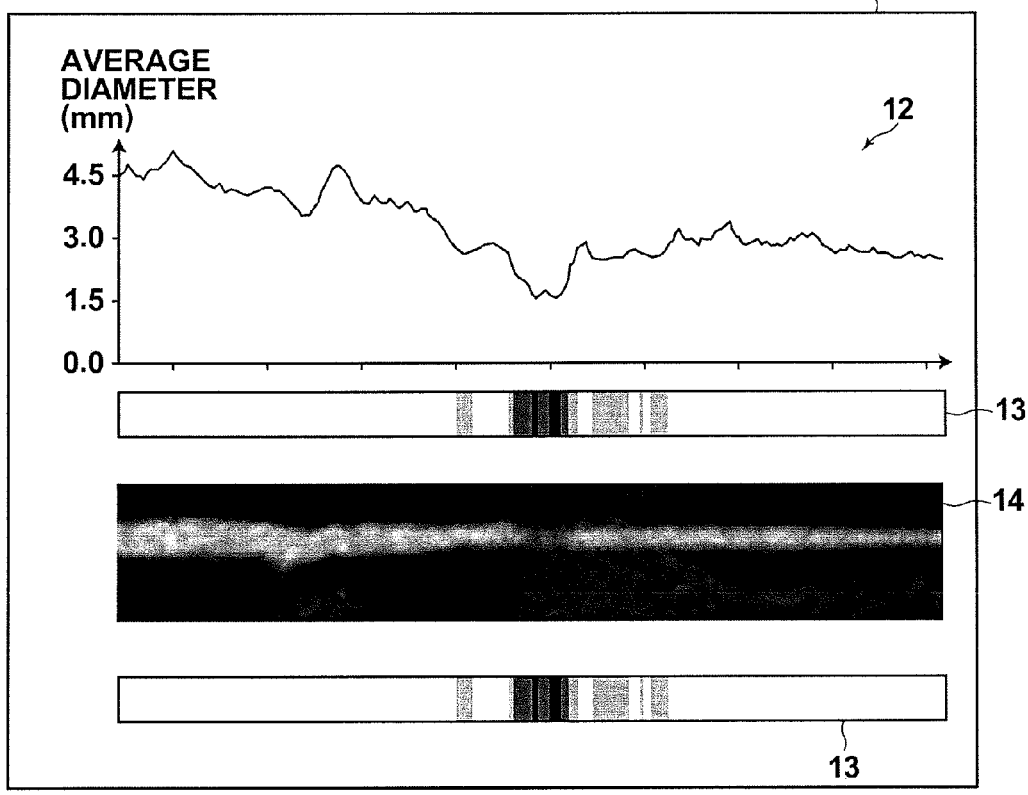
FIG. 10 is a diagram that illustrates another example of a diagnosis screen.
FIG. 11 is a diagram that illustrates another example of a conversion table.

Next, another example of a conversion table referred to by the color determining means 104 is shown in FIG. 11. The conversion table 10B of FIG. 11 is a map that correlates plaque codes that represent the types of detected plaque with RGB values. Cases in which neither hard plaque nor soft plaque is detected (code 00) are correlated with "black", cases in which hard plaque is detected (code 01) are correlated with "yellow", cases in which soft plaque is detected (code 10) are correlated with "orange", and cases in which both hard plaque and soft plaque are detected (code 11) are correlated with "red".

In the case that the color determining means 104 refers to the conversion table 10B to determine colors, the display control means 105 displays the condition display region 13 with colors according to whether plaque is present and the type of plaque in the display screen 11A or 11B. The condition of coronary arteries cannot be accurately diagnosed only from the presence or absence of plaque and the type thereof. However, in cases that healthy people are included in subjects, such as at routine medical checkups, whether plaque is present can be intuitively judged by the colored display. Therefore, this manner of display is effective in the case that healthy people and people who require further observation are to be classified broadly.

In addition, the color determining means 104 may refer to the conversion table 10A to determine colors that represent stenosis rates, and further refer to the conversion table 10B to determine colors that represent whether plaque is present and the type of plaque. The number of conversion tables is not limited to 2, and three or more conversion tables may be referred to, to determine a plurality of colors with respect to each of the cross sections.

In the case that the color determining means 104 refers to two conversion tables, the screen output by the display control means 105 is a display screen 11C as illustrated in FIG. 12. In the display screen 11C, a condition display region 13 and a condition display region 15 are arranged above and below the CPR image 14. The condition display region 13 is a region displayed with colors determined based on the conversion table 10A. The condition display region 15 is a region displayed with colors determined based on the conversion table 10B.

In the display screen 11C, the stenosis rates, whether plaque is present, and the type of plaque can all be intuitively understood by the displayed colors. It is necessary to carefully observe stenosis caused by soft plaque even if the stenosis rate is low. In this respect, the display screen 11C enables confirmation of the stenosis rate by the colors of the condition display region 13, as well as confirmation of the type of plaque by the colors of the condition display region 15. Therefore, dangerous conditions and conditions that require care can be found efficiently.

The condition display region 13 and the condition display region 15 may be arranged adjacent to each other either above or below the CPR image. However, by separating them to be arranged above and below the CPR image, confusion is less likely to occur during diagnosis.

The conversion tables 10A and 10B and the display screens 11A, 11B, ad 11C have been described above. The memory of the diagnosis assisting apparatus 1 additionally has stored therein: a conversion table that correlates stenosis rates focused only on soft plaque and RGB values; a conversion table that correlates stenosis rates focused only on hard plaque and RGB values; a conversion table that correlates the presence of soft plaque and RGB values; and a conversion table that correlates the presence of hard plaque and RGB values. The color determining means 104 selectively refers to one or a plurality of conversion tables selected by the user when performing the color determining process. In addition, the display control means 105 determines the number of condition display regions to be arranged in a display screen and an image layout according to the number of selected conversion tables.

According to the diagnosis assisting apparatus, the diagnosis assisting program, and the diagnosis assisting method of the present embodiment, index values that represent stenosis rates, the type of plaque, etc., are displayed not as numbers but as colors. Accordingly, physicians are enabled to intuitively understand the conditions of stenosis estimated by the diagnosis assisting apparatus. The colors are not added to the image for observation, but are displayed in the condition display regions outside the image to be observed. Therefore, observation of the image being hindered due to colors being added thereto is prevented. Thereby, the physicians can carefully perform diagnosis by not only referring to the colors displayed by the diagnosis assisting apparatus, but also be confirming the image that represents the intima of the blood vessel with their own eyes.

In the present embodiment, a CPR image is displayed as the image for observation, and the colored display of the condition display region is also performed for the same range as that of the CPR image. Therefore, conditions of stenosis can be understood for a comparatively wide range of a blood vessel within a short amount of time. Further, the straightened CPR image will be a linear image even if the observation range is changed. Therefore, the screen layout can be a simple layout of which display control is easy.

As described previously, in the case that the cause of stenosis is soft plaque, care is necessary even if the stenosis rate is not high. In this respect, the present embodiment performs colored display not only regarding stenosis rates but also regarding types of plaque. This configuration contributes to early discovery and early treatment of soft plaque.

In the present embodiment, the conversion tables referred to by the color determining means can be selected from among a plurality of conversion tables, and the number of condition display regions to be arranged in the display screen is increased or decreased according to the number of index values that require intuitive understanding. For this reason, the diagnosis assisting apparatus of the present invention can be employed for various diagnostic uses.

Note that the present invention is not limited to the embodiment described above. Various changes and modifications may be applied as long as they do not stray from the spirit of the invention.

For example, the process for extracting the coronary artery region performed by the blood vessel extracting means 101 may be the method disclosed in Japanese Unexamined Patent Publication No. 2006-167287 (Patent Document 1). The method disclosed in this document extracts the cores of blood vessels by a vessel tracking technique, sets cross sections perpendicular to the cores, and extracts contour points of the blood vessels when extracting a blood vessel region. Accordingly, the cores and the cross sections are automatically set during the steps of the blood vessel region extracting process. Various other known methods may be employed to extract the coronary artery region, to set the cores, and to set the cross sections.

As another example, the CPR image generating means 102 may generate a stretched CPR image or a projected CPR image instead of the straightened CPR image. The image of the coronary artery will zigzag in stretched CPR images and projected CPR images. However, by causing the condition display regions 13 and 15 as band shaped regions that zigzag in the same manner as the CPR images, the CPR images and the condition display regions can be arranged parallel to each other.

As still another example, the above embodiment broadly classifies plaque into two types, soft plaque and hard plaque. Alternatively, the condition estimating means 103 may classify plaque into more detailed types based on signal values output by modalities.

As still yet another example, the color determining means 104 may determine colors not by referring to the conversion tables, but by performing calculations using predetermined formulas. For example, if a formula is defined such that the RGB values differ according to stenosis rates, the colors of the condition display region will be displayed as a gradation.

In addition, the display control means controls the observation range in the above embodiment. Alternatively, the CPR image generating means 102 may generate a CPR image only for the observation range, based on data regarding the observation range. The condition estimating means 103 may also perform processes only with respect to the observation range, based on data regarding the observation range.

Further, the display control means 105 arranges the straightened CPR image such that the core of the blood vessel extends in the horizontal direction of the display screen. Alternatively, the straightened CPR image may be rotated 90 degrees such that the core of the blood vessel extends in the vertical direction of the screen. In this case, the graph 12, the condition display region 13, and the condition display region 15 are also rotated 90 degrees and displayed.

Still further, the diagnosis assisting apparatus may be that which divides the functions of the blood vessel extracting means, the CPR image generating means, the condition estimating means, the color determining means, and the display control means among a plurality of computers. Various known devices may be employed as the components that constitute the system, such as the input devices and the display. For example, a joystick may be employed instead of the mouse, and a touch panel may be employed instead of the display.

Note that it goes without saying that the present invention is not limited to diagnosing conditions of stenosis in coronary arteries, but also effective in diagnosing conditions of stenosis in various blood vessels, such as the carotid arteries.

The invention claimed is:

1. A diagnosis assisting apparatus, characterized by comprising: blood vessel extracting means, for extracting a blood vessel region that represents a blood vessel from volume data obtained by imaging, and for setting a core of the blood vessel and a plurality of cross sections perpendicular to the core;
CPR image generating means, for generating a CPR image that represents a range corresponding to at least a portion of the blood vessel based on data regarding the blood vessel region, the core, and each of the cross sections;
condition estimating means, for estimating the condition of stenosis of the blood vessels at each of the cross sections, by analyzing data included in the blood vessel region at each of the cross sections, and the condition of stenosis is represented by index values;
color determining means, for determining each color corresponding to each index value that represents the estimated condition of stenosis in each of the cross sections; and
display control means, for arranging the CPR image in a predetermined region of a display screen, arranging at least one band shaped condition display region parallel to the center line of the blood vessel represented by the CPR image, and for displaying the condition display region with colors in which each color determined by the color determining means is plotted at the position thereof corresponding to each portion of the cross sections in the CPR image.

2. A diagnosis assisting apparatus as defined in claim 1, wherein:
the condition estimating section estimates the stenosis rate of the blood vessel and/or the type of plaque as the condition of stenosis.

3. A diagnosis assisting apparatus as defined in claim 1, wherein:
the display control section arranges a plurality of condition display regions in the display screen.

4. A diagnosis assisting apparatus as defined in claim 3, wherein:
the display control section arranges two condition display regions so as to sandwich the CPR image therebetween.

5. A diagnosis assisting apparatus as defined in claim 3 wherein:
the condition estimating section estimates the stenosis rate of the blood vessel and the type of plaque as the condition of stenosis;
the color determining section determines colors corresponding to the stenosis rate and the type of plaque for each cross section; and
the display control section displays a first condition display region with colors based on the stenosis rates and a second condition display region with colors based on the types of plaque.

6. A diagnosis assisting apparatus as defined in claim 1, wherein:
the CPR image generated by the CPR image generating section is a straight CPR image.

7. A diagnosis assisting apparatus as defined in claim 1, wherein:
the color determining section determines colors using one or a plurality of conversion tables which are stored in advance.

8. A non transitory computer readable recording medium having a diagnosis assisting program stored therein, the diagnosis assisting program causing at least one computer to function as:
blood vessel extracting section, for extracting a blood vessel region that represents a blood vessel from volume data obtained by imaging, and for setting a core of the blood vessel and a plurality of cross sections perpendicular to the core;
CPR image generating section, for generating a CPR image that represents a range corresponding to at least a portion of the blood vessel based on data regarding the blood vessel region, the core, and each of the cross sections;
condition estimating section, for estimating the condition of stenosis of the blood vessels at each of the cross sections, by analyzing data included in the blood vessel region at each of the cross sections, and the condition of stenosis is represented by index values;
color determining section, for determining each color corresponding to each index value that represents the estimated condition of stenosis in each of the cross sections; and
display control section, for arranging the CPR image in a predetermined region of a display screen, arranging at least one band shaped condition display region parallel to the center line of the blood vessel represented by the CPR image, and for displaying the condition display region with colors in which each color determined by the color determining section is plotted at the position thereof corresponding to each portion of the cross sections in the CPR image.

9. A diagnosis assisting method, comprising:
a blood vessel extracting step, for extracting a blood vessel region that represents a blood vessel from volume data obtained by imaging, and for setting a core of the blood vessel and a plurality of cross sections perpendicular to the core;
a CPR image generating step, for generating a CPR image that represents a range corresponding to at least a portion of the blood vessel based on data regarding the blood vessel region, the core, and each of the cross sections;
a condition estimating step, for estimating the condition of stenosis of the blood vessels at each of the cross sections, by analyzing data included in the blood vessel region at each of the cross sections, and the condition of stenosis is represented by index values;
a color determining step, for determining each color corresponding to each index value that represents the estimated condition of stenosis in each of the cross sections; and
a display control step, for arranging the CPR image in a predetermined region of a display screen, arranging at least one band shaped condition display region parallel to the center line of the blood vessel represented by the CPR image, and for displaying the condition display region with colors in which each determined color is plotted at the position thereof corresponding to each portion of the cross section in the CPR image.

* * * * *